United States Patent [19]

DeBoer et al.

[11] Patent Number: 5,298,845

[45] Date of Patent: Mar. 29, 1994

[54] ANTI-WINDUP PROPORTIONAL PLUS INTEGRAL CONTROLLER

[75] Inventors: David P. DeBoer, Cedarburg, Wis.; David W. Jiral, Huntington, Ind.

[73] Assignee: Johnson Service Company, Milwaukee, Wis.

[21] Appl. No.: 785,342

[22] Filed: Oct. 31, 1991

[51] Int. Cl.$^5$ .............................................. G05B 11/42
[52] U.S. Cl. ...................................... 318/609; 318/610
[58] Field of Search ........................ 318/609, 610, 590

[56] References Cited

U.S. PATENT DOCUMENTS

| | | | |
|---|---|---|---|
| 3,727,036 | 4/1973 | O'Connor et al. | 318/609 |
| 3,938,017 | 2/1976 | Hayes | 318/610 |
| 3,939,328 | 2/1976 | Davis | 318/609 |
| 3,946,297 | 3/1976 | Bechtel | 318/609 |
| 4,118,774 | 10/1978 | Franke | 318/590 |
| 4,319,173 | 3/1982 | Rhodes | 318/609 |
| 4,520,301 | 5/1985 | Suzuki | 318/609 |
| 4,806,836 | 2/1989 | Webb | 318/609 |
| 5,119,005 | 6/1992 | Tsai et al. | 318/609 |

Primary Examiner—William M. Shoop, Jr.
Assistant Examiner—Brian Sircus
Attorney, Agent, or Firm—Foley & Lardner

[57] ABSTRACT

A proportional plus integral controller operates an actuator in an HVAC system. The controller includes a setpoint circuit for providing a setpoint signal representative of a desired room temperature, a sensor circuit for providing a sensor signal representative of the actual room temperature, an error generator for generating an error signal proportional to the difference between the setpoint signal and the sensor signal, and an integrator for generating a control signal related to the time integral of the error signal. The setpoint and sensor signals are derived from a common voltage reference, so that accuracy of the controller is substantially independent of fluctuations of that reference. The integrator includes a capacitance multiplier that provides highly accurate integration of the error signal and a switch for selecting either proportional plus integral or proportional only control. The controller includes an integration disable circuit that removes the integral term from the control signal when the proportional component becomes large enough to fully drive the actuator. The controller also includes a mode selector to configure the controller to operate in either a heating or cooling mode.

20 Claims, 4 Drawing Sheets

ANTI-WINDUP PROPORTIONAL PLUS INTEGRAL CONTROLLER

FIELD OF THE INVENTION

This invention relates to closed loop control systems and, more particularly, to an anti-windup proportional plus integral controller for providing accurate, closed loop HVAC (heating ventilation and air conditioning) and refrigeration control.

BACKGROUND OF THE INVENTION

Closed loop electronic control systems of the type contemplated herein are commonly used to control the temperature of a fluid or gas for any of a variety of purposes. For example, HVAC systems are used to control the temperature of air inside buildings and other enclosures designed for human occupancy. Refrigeration systems are typically used to store food, chemicals and other materials.

Many applications of temperature control systems require highly precise control of fluid or gas temperature. Because humans can sense changes in temperature of as little as 2° F., HVAC systems must be able to precisely control the temperature of large volumes of air to maximize human comfort. To this end, various types of control systems have been employed in an attempt to provide well regulated control of temperature.

One type of closed loop control that has been used is a proportional controller. In general terms, proportional controllers operate to control a process variable on the basis of the difference between the measured or sensed value of that variable and a desired value of that variable. This difference typically takes the form of an error signal that is generated by subtracting the sensed value of the variable from the desired value (setpoint). This error signal is then used to operate an actuator or other controlled device that moves the process variable toward the setpoint. The sensitivity of these controllers to the error signal can be set as required by choosing an appropriate level of amplification of the error signal. Thus, the system can be made highly sensitive by a large amplification of the error signal. In many applications, this may provide suitable, accurate control of a process variable. However, increasing the sensitivity of a proportional controller will in most applications increase the instability of the system. Overshoots of the setpoint and oscillations can occur at frequencies related to the time constants of the variable as well as those of the control system. This can effectively limit the accuracy of a proportional controller.

Another disadvantage that is inherent in proportional control is that an error must exist between the sensed value and setpoint in order to produce a control output other than a predetermined initially set or calibrated value. Because the control variable or load in most systems require a continuous, but variable input to maintain the load at the setpoint, the system will inherently contain a certain amount of error between the sensed value and setpoint, colloquially known as "droop". This error may also appear as minor oscillations of the value of the controlled variable about the setpoint. However, in systems such as HVAC systems, such minor variations may be substantial enough that they can be felt by humans.

Controllers incorporating integral action are used to eliminate droop and to increase the sensitivity of the controller without decreasing system stability. These controllers are commonly referred to as proportional plus integral (PI) controllers. PI controllers eliminate droop because even small variations of the sensed value from the setpoint are integrated, thereby resulting in an increasing control signal which will bring the process variable back to the setpoint. An example of such a PI controller is disclosed in U.S. Pat. No. 3,946,297, issued Mar. 23, 1976, to J. H. Bechtel.

There are, however, several aspects of PI control that reduce accuracy and stability. The first, known as windup, occurs when the device that controls the system variable is driven to its maximum position or output in an effort to bring the system variable to its setpoint. If the system variable does not return toward setpoint (i.e., the load is greater than the control capability of the controlled device), the PI controller will continue to integrate the error signal and will thus, "windup". The controlled device will remain at maximum output until the system variable has crossed the setpoint and enough inverse error has been integrated to remove the integral windup. This effectively decreases the accuracy and stability of the system by causing large overshoots of the setpoint.

It is therefore desirable to eliminate windup in PI control systems. One such means for eliminating windup is disclosed in U.S. Pat. No. 3,938,017, issued Feb. 10, 1976 to T. E. Hayes. In that patent, proportional plus integral control is provided by independently generating the proportional and integral terms of the control signal, which are then summed together. The integral term is generated by an integrator circuit that includes a programmable operational amplifier. This programmable op-amp is a special type of op-amp in that it includes a control input for selectively disabling its operation. Windup is avoided by disabling the op-amp when it becomes saturated. Once the op-amp is disabled, the integral term is forced to zero and the control signal therefore provides only proportional control. The provision of separate channels for generating the proportional and integral terms of the control signal increases the size and complexity of the controller.

A second source of inaccuracy in PI controllers is the capacitive element (typically a capacitor) used to store the integrated value of the error signal. For HVAC and many other systems, integrating time constants on the order of minutes and parts of an hour are required to match the long time constants of air temperature changes. Otherwise, the controller will continuously over- and under-shoot the setpoint temperature. The time constant of the integrator portion of a PI controller is determined by the resistance and capacitance used in the feedback loop. That is, $\tau = RC$. However, capacitors (including tantalum or aluminum electrolytics) having a capacitance over approximately 47 $\mu$F allow a relatively large amount of current to flow through the capacitor. Such a current is known as leakage current and is substantial enough to undesirably effect integrator accuracy. The effect of leakage current can be modeled as a resistance connected across the capacitor which creates a voltage divider with the resistor used to determine the time constant ($\tau = RC$). As a result, the feedback into the input of the integrating amplifier may be erroneously low and a correspondingly low integral will result. Thus, a capacitor having a high leakage current will reduce the ability of the system to accurately achieve the setpoint value of the system variable.

A solution to leakage current that is sometimes available is to chose a large value of resistance (R) and a small value of capacitance (C) for the time constant equation, since leakage current has a direct relationship to capacitance value. However, this solution is unavailable for very large time constants such as those required in HVAC controllers because it would require resistance values upwards of tens and hundreds of megohms. Such resistances may be greater than the resistance between traces on a printed circuit board or, because of moisture condensing from surrounding air, between individual components. Thus, there is a need for providing a large integration time constant using a resistance no more than approximately one megohm and a capacitor having a small leakage current.

Proportional and PI controllers typically require both positive and negative direct current power supply voltages. For controllers operable from alternating current supplies, such as the 24 volt alternating current standard in HVAC systems, this requires separate generation of both positive and negative voltages, which increases the size and complexity of controller designs. Thus, it would be desirable to provide a PI controller operable from a single supply (e.g., from positive voltages only).

SUMMARY OF THE INVENTION

The present invention addresses the aforementioned shortcomings of prior art controllers by providing an anti-windup proportional plus integral controller that comprises a setpoint circuit for generating a setpoint signal representative of a desired value of a system variable, a sensor circuit for generating a sensor signal representative of a measured value of the system variable, an error generator that generates an error signal proportional to the difference between the setpoint signal and sensor signal, an integrator for generating a control signal related to the time integral of the error signal, and an integration disable circuit for selectively disabling the error signal integration. The sensor and setpoint signals are derived from a common reference voltage so that their difference is substantially independent of fluctuations of that reference voltage. The error signal provided by the error generator is offset by the reference voltage, which in effect shifts the ground reference of the error signal. This permits operation of the controller from a single supply. The integrator circuit includes a capacitance multiplier that simulates a high value, low leakage capacitor to achieve the long integration time constants required for HVAC control. A mode selector is also provided that permits the controller to be operated in either a heating or cooling mode.

BRIEF DESCRIPTION OF THE DRAWINGS

A preferred exemplary embodiment of the present invention will hereinafter be described in conjunction with the appended drawings, wherein like numerals denote like elements, and wherein:

FIG. 2 consists of FIGS. 2A, 2B, and 2C and is a schematic of a preferred embodiment of the present invention;

DESCRIPTION OF THE PREFERRED EMBODIMENTS

Figure 1:
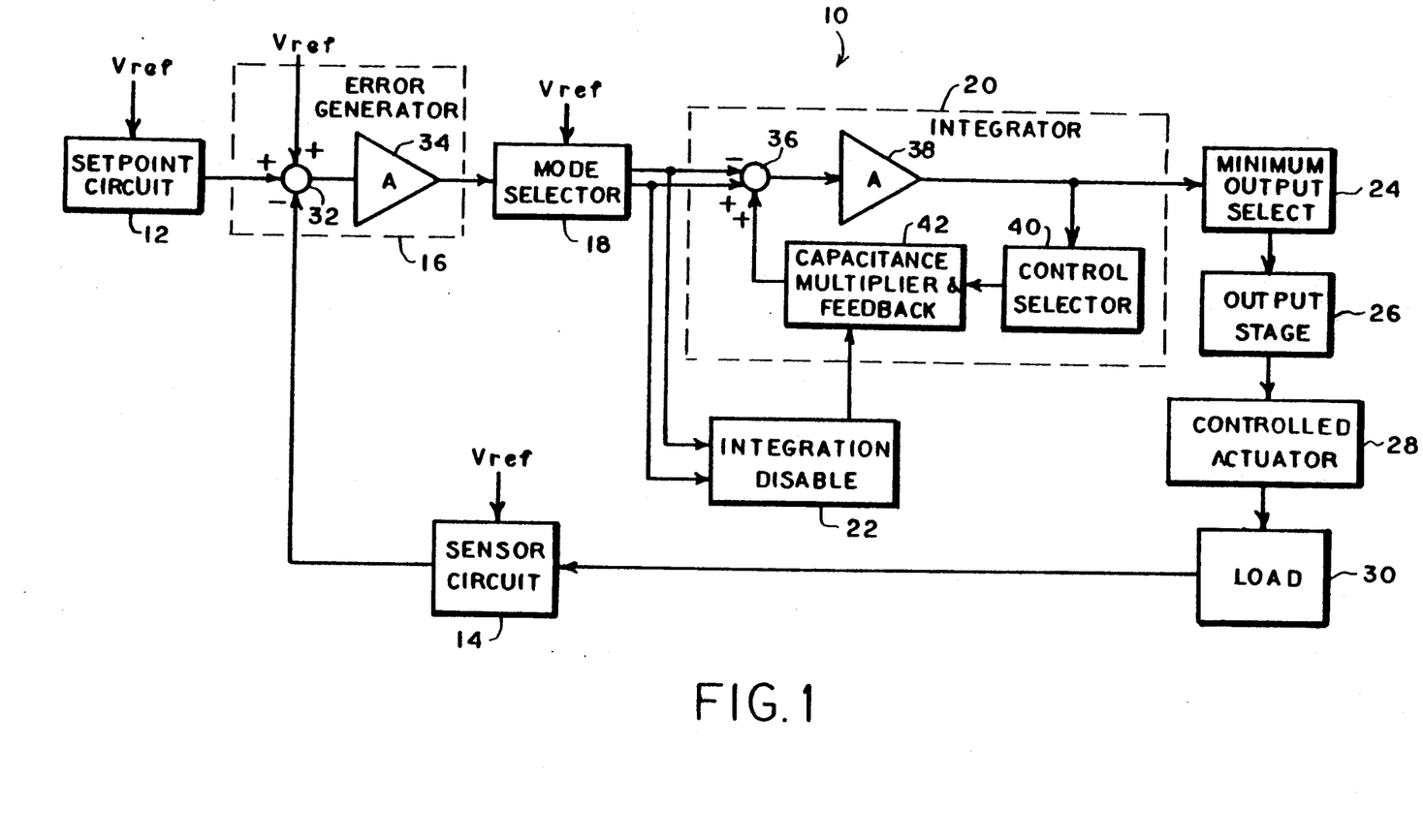
FIG. 1 is a block diagram of a preferred embodiment of the proportional plus integral controller of the present invention.

As shown in FIG. 1, a preferred embodiment of the PI controller of the present invention, designated generally as 10, includes a setpoint circuit 12, a sensor circuit 14, an error generator 16, a mode selector 18, an integrator 20, an integration disable circuit 22, a minimum output select circuit 24, an output stage 26, and a controlled actuator 28. Error generator 16 provides mode selector 18 with an error signal proportional to the difference between the values provided by setpoint circuit 12 and sensor circuit 14. Mode selector 18 configures integrator 20 to operate in either a heating or cooling mode. Integration disable 22 provides the anti-windup feature of PI controller 10 by causing integrator 20 to operate in a proportional only mode when the error signal exceeds a predetermined value, as will be described in more detail below.

Integrator 20 generates a PI control signal that is fed into minimum output select 24. Minimum output select 24 scales the PI control signal to provide a predetermined minimum output value. Output stage 26 is responsive to this scaled signal to provide the power needed to run controlled actuator 28, which in turn controls a system variable represented as a load 30. Preferably, the system variable is air temperature, load 30 comprises a volume of air in an enclosed space designed for human occupancy, and the inverting and non-inverting modes selectable by mode selector 18 therefore correspond to heating and cooling modes, respectively. Sensor circuit 14 monitors the temperature of room air 30, thereby closing the system loop.

Error generator 16 preferably includes a comparator 32 and an error amplifier 34. Comparator 32 provides error amplifier 34 with a difference signal equal to the setpoint value provided by setpoint circuit 12 minus the sensor value provided by sensor circuit 14. This difference signal is offset from the zero or ground reference by a reference value (Vref). Error amplifier 34 amplifies this difference signal to produce the error signal.

Integrator 20 includes a summing junction 36, an amplifier 38, a control selector 40, and a capacitance multiplier and feedback circuit 42. The error signal and Vref are combined at summing junction 36 in a manner determined by mode selector 18. A feedback signal generated by feedback circuit 42 is also summed into junction 36. The combination of these various inputs to junction 36 are amplified by amplifier 38 to produce the PI control signal. As will be explained in more detail below, the integral term of the PI control signal is generated by providing the PI control signal to junction 36 via control selector 40 and feedback circuit 42.

Figure 2A:
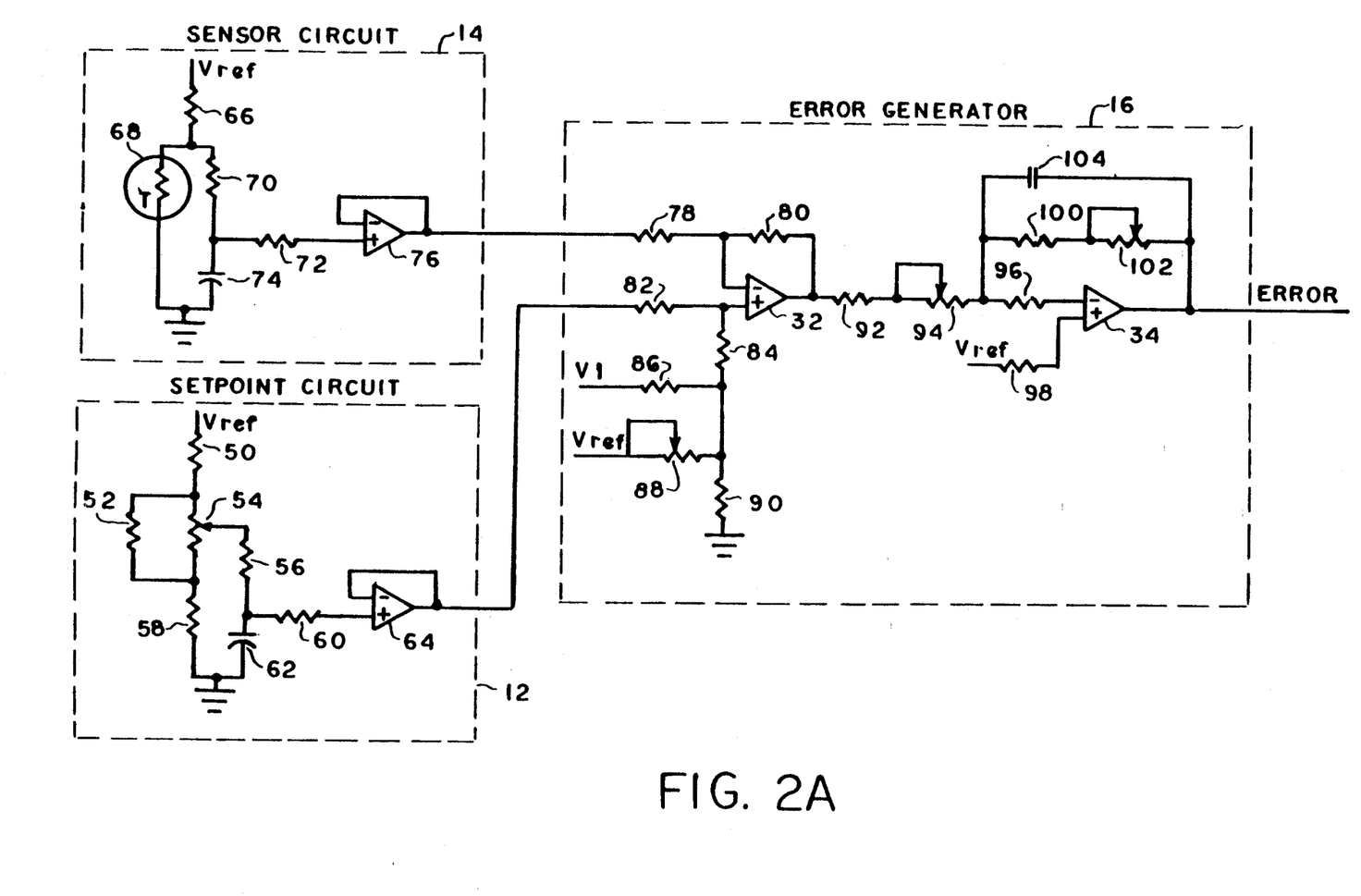
FIG. 2A contains a schematic representation of the sensor, setpoint and error generator circuits.

Referring first to FIG. 2A, the following is a description of the preferred embodiment of the component blocks of PI controller 10 described above and depicted in FIG. 1. Setpoint circuit 12 includes resistors 50, 52, 54, 56, 58, and 60, a capacitor 62, and an operational amplifier 64. One end of resistor 50 is connected to a reference voltage Vref. The other end of resistor 50 is connected to a first end of resistors 52 and 54. Resistor 54 is a three terminal variable resistor, the third terminal being a wiper arm connected to a first end of resistor 56. The second end of resistor 54 is connected to the second end of resistor 52 and one end of resistor 58. The other end of resistor 58 is connected to a common ground. The second end of resistor 56 is connected to one end of resistor 60 and to the positive terminal of capacitor 62. The negative terminal of capacitor 62 is connected to common ground. The other end of resistor 60 is connected to the non-inverting input of op-amp 64. The output of op-amp 64 is connected to its inverting input.

Sensor circuit 14 includes resistors 66, 68, 70, and 72, a capacitor 74, and an operational amplifier 76. Resistor 66 is connected between Vref and one end of resistors 68 and 70. The other end of resistor 68 is connected to common ground. The other end of resistor 70 is connected to a first end of resistor 72 and the positive terminal of capacitor 74. The negative terminal capacitor 74 is connected to common ground. The second end of resistor 72 is connected to the non-inverting input of op-amp 76. The output of op-amp 76 is connected to its inverting input. Resistor 68 preferably comprises a thermistor of the type having a positive temperature coefficient.

Error generator 16 includes resistors 78, 80, 82, 84, 86, 88, 90, 92, 94, 96, 98, 100, and 102, a capacitor 104, an operational amplifier comprising comparator 32, and an operational amplifier comprising error amplifier 34. One end of resistor 78 is connected to the output of op-amp 76. The other end of resistor 78 is connected to the inverting input to comparator 32 and to a first end of resistor 80. One end of resistor 82 is connected to the output of op-amp 64. The other end of resistor 82 is connected to the non-inverting input of comparator 32 and to a first end of resistor 84. Resistor 86 is connected between a voltage V1 and the second end of resistor 84. Resistor 88 is a variable resistor connected between Vref and the second end of resistor 84. Resistor 90 is connected between the second end of resistor 84 and ground. The second end of resistor 80 is connected to the output of comparator 32, which is also connected to a first end of resistor 92. Resistor 94 is a variable resistor connected between the second end of resistor 92 and a first end of resistor 96. This end of resistor 96 is also connected to a first end of resistor 100 and capacitor 104. The second end of resistor 96 is connected to the inverting input of error amplifier 34. Resistor 98 is connected between Vref and the non-inverting input to error amplifier 34. The output of error amplifier 34 is connected to the second end of capacitor 104 and to one end of resistor 102. Resistor 102 is a variable resistance having its other end connected to the second end of resistor 100.

Figure 2B:
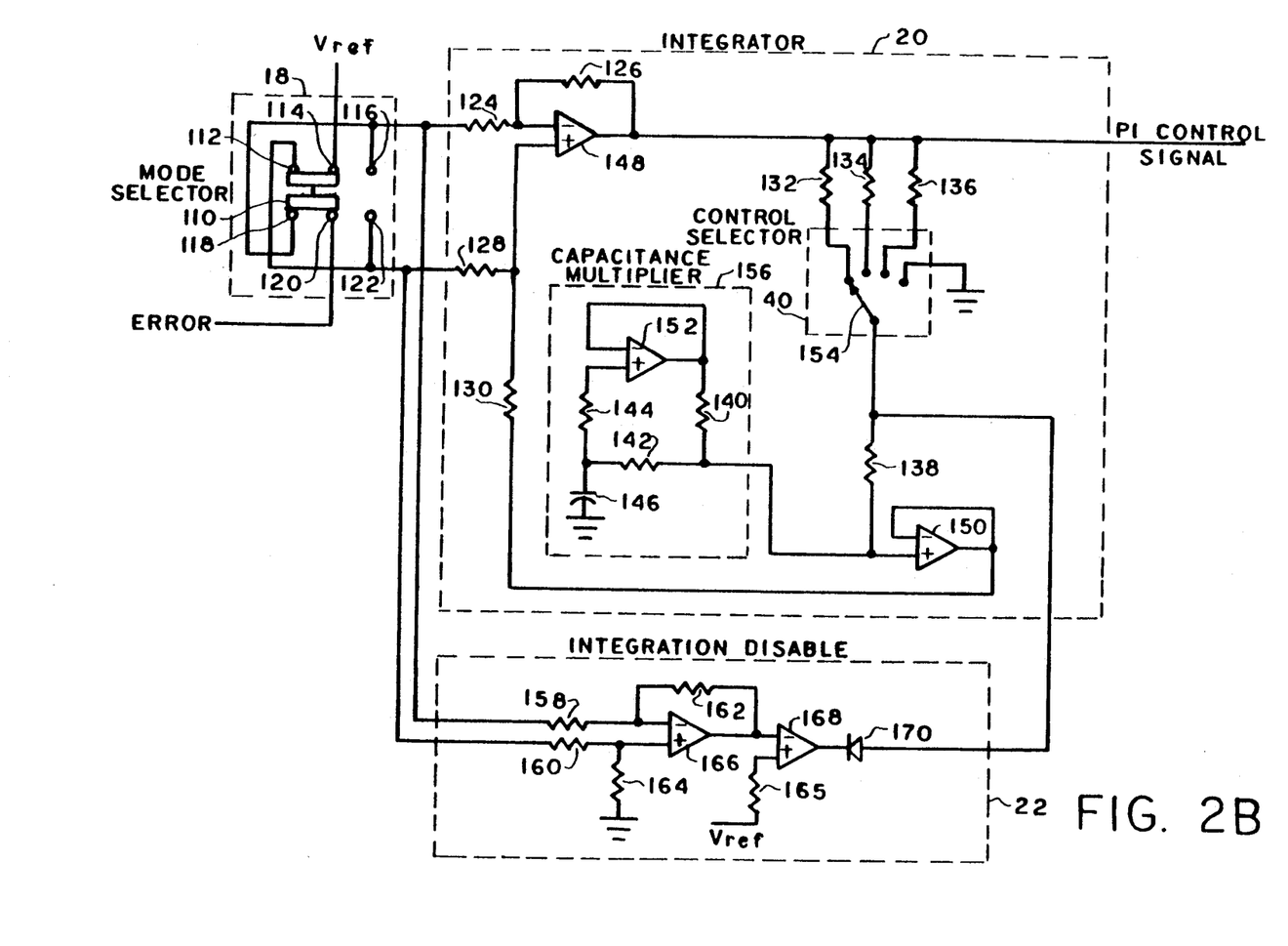
FIG. 2B includes a schematic representation of the mode selector, integrator, and integration disable circuits.

Referring now to FIG. 2B, mode selector 18 suitably comprises a double-pole, double-throw switch 110. Switch 110 has terminals 112, 114, 116, 118, 120, and 122 arranged into two channels. In a first position, switch 110 electrically shorts terminal 112 to terminal 114 and terminal 118 to terminal 120. In a second position, switch 110 electrically shorts terminal 114 to terminal 116 and terminal 120 to terminal 122. Terminal 114 is connected to Vref. Terminal 120 is connected to the output of error amplifier 34. Terminal 112 is connected to terminal 122 and terminal 116 is connected to terminal 118.

Integrator 20 includes resistors 124, 126, 128, 130, 132, 134, 136, 138, 140, 142, and 144, a capacitor 146, an operational amplifier comprising integrating amplifier 148, two unity gain operational amplifiers 150 and 152, and control selector 40. Resistor 124 is connected between terminal 116 of switch 110 and the inverting input to op-amp 148. Resistor 126 is connected between the output and inverting input of op-amp 148. Resistor 128 is connected between terminal 122 of switch 110 and the non-inverting input to op-amp 148. Resistor 130 is connected between the non-inverting input to op-amp 148 and the output of op-amp 150.

A first end of resistors 132, 134, and 136 are each connected to the output of op-amp 148. Control selector 40 includes a four-position switch 154 for selectively connecting a first end of resistor 138 either to ground or to a second end of any one of resistors 132, 134, and 136 The second end of resistor 138 is connected to a first end of resistors 140 and 142 and to the non-inverting input of op-amp 150. The output of op-amp 150 is connected to its inverting input. The second end of resistor 140 is connected to the output and inverting input of op-amp 152. The second end of resistor 142 is connected to the positive terminal of capacitor 146. The negative terminal of capacitor 146 is connected to ground. Resistor 144 is connected between the non-inverting input of op-amp 152 and the positive terminal of capacitor 146. Resistors 140, 142, and 144, capacitor 146, and op-amp 152 comprise a capacitance multiplier 156, the operation of which is described below.

Integration disable 22 includes resistors 158, 160, 162, 164, and 165, operational amplifiers 166 and 168, and a diode 170. Resistor 158 is connected between terminal 116 of switch 110 and the inverting input to op-amp 166. Resistor 160 is connected between terminal 122 of switch 110 and the non-inverting input of op-amp 166. Resistor 162 is connected between the output and inverting input of op-amp 166. Resistor 164 is connected between the non-inverting input of op-amp 166 and ground. The output of op-amp 166 is connected to the inverting input of op-amp 168. Resistor 165 is connected between Vref and the non-inverting input of op-amp 168. The output of op-amp 168 is connected to the cathode of diode 170. The anode of diode 170 is connected to the first end of resistor 138.

Figure 2C:
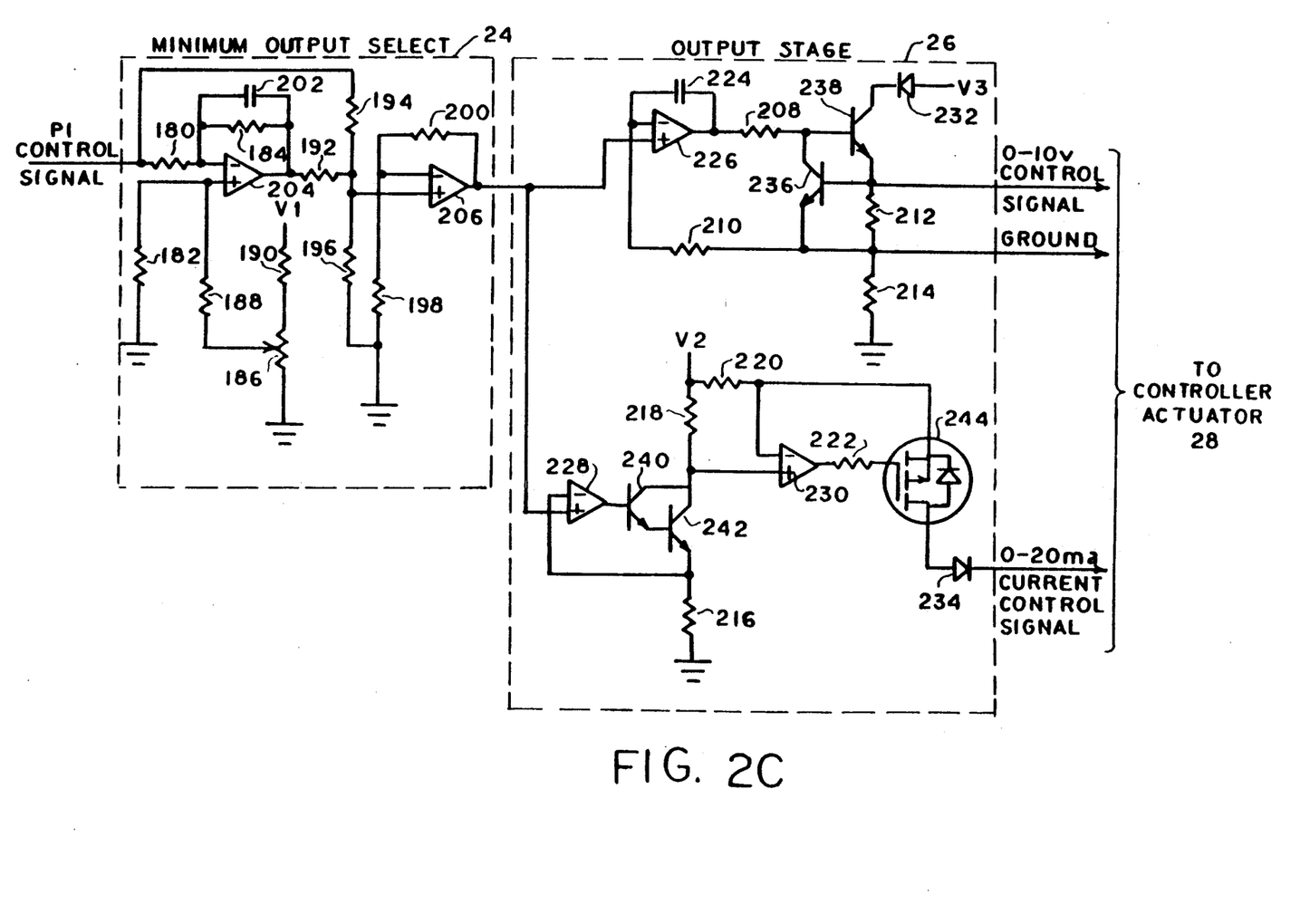
FIG. 2C is a schematic representation of the minimum output select and output stage circuits.

Referring now to FIG. 2C, minimum output select 24 includes resistors 180, 182, 184, 186, 188, 190, 192, 194, 196, 198, and 200, a capacitor 202, and operational amplifiers 204 and 206. Resistor 180 is connected between the output of op-amp 148 and the inverting input to op-amp 204. Resistor 182 is connected between the non-inverting input of op-amp 204 and ground. Resistor 184 is connected between the output and inverting input of op-amp 204. Resistor 186 is a three terminal variable resistor, the third terminal being a wiper arm connected to one end of resistor 188. The other end of resistor 188 is connected to the non-inverting input of op-amp 204. Resistor 190 is connected between V1 and the first terminal of resistor 186. The second terminal of resistor 186 is connected to ground. Resistor 192 is connected between the output of op-amp 204 and the non-inverting input to op-amp 206. Resistor 194 is connected between the non-inverting input of op-amp 206 and the output of op-amp 148. Resistor 196 is connected between the non-inverting input to op-amp 206 and ground. Resistor 198 is connected between the inverting input of op-amp 206 and ground. Resistor 200 is connected between the output and inverting input of op-amp 206.

Output stage 26 includes resistors 208, 210, 212, 214, 216, 218, 220, and 222, a capacitor 224, operational amplifiers 226, 228, and 230, diodes 232 and 234, and transistors 236, 238, 240, 242, and 244. The non-inverting inputs to op-amps 226 and 228 are connected to the output of op-amp 206. Capacitor 224 is connected between the output and inverting input of op-amp 226. Resistor 208 is connected between the output of op-amp 226 and the collector of transistor 236. Resistor 210 is connected between the inverting input of op-amp 226 and the emitter of transistor 236. The base of transistor 236 is connected to the emitter of transistor 238. The collector of transistor 236 is connected to the base of transistor 238. The cathode of diode 232 is connected to the collector of transistor 238. The anode of diode 232 is connected to a voltage V3. Resistor 212 is connected between the base and emitter of transistor 236. Resistor 214 is connected between the emitter of transistor 236 and ground.

The output of op-amp 228 is connected to the base of transistor 240. The collector of transistor 240 is connected to the collector of transistor 242. The emitter of transistor 240 is connected to the base of transistor 242. The emitter of transistor 242 is connected to the inverting input of op-amp 228. Resistor 216 is connected between the emitter of transistor 242 and ground. Resistor 218 is connected between a voltage V2 and the collectors of transistors 240 and 242. The collectors of transistors 240 and 242 are connected to the non-inverting input of op-amp 230. Resistor 220 is connected between V2 and the inverting input of op-amp 230. Resistor 222 is connected between the output of op-amp 230 and the gate of transistor 244. The source of transistor 244 is connected to the inverting input of op-amp 230. The drain of transistor 244 is connected to the anode of diode 234.

Output stage 26 is coupled to actuator 28 which may suitably be any device capable of affecting the system variable sought to be controlled by PI controller 10. In HVAC systems, actuator 28 may comprise a fan or blower, a motor actuated valve, or a motor actuated damper. The particular actuator or device used is not at all pertinent to the invention.

Op-amps 64, 76, 150, and 152 may each suitably comprise one-fourth of a TLC279C, manufactured by Texas Instruments. Op-amps 32, 34, 148, and 204 may each suitably comprise one-fourth of a LMC660, manufactured by National Semiconductor. Op-amps 166 and 168 preferably comprise an LM358, manufactured by National Semiconductor. Op-amps 206, 226, 228, and 230 suitably comprise an LM324A, manufactured by National Semiconductor. Transistor 236 can be a MPSA06 and transistor 238 can be a MPSW06, both manufactured by Motorola. Transistors 240 and 242 operate as a Darlington pair and preferably comprise an MPSA13, manufactured by Motorola. Transistor 244 can be a P-channel FET, such as an RFP2P08, manufactured by RCA. Mode selector 18 and control selector 40 can be jumper blocks, as will be understood by those skilled in the art.

Preferably, Vref is 5 volts; V1 is 10.65 volts and is used to supply power to op-amps 32, 34, 148, and 204; V2 is 17.5 volts; V3 is 19.5 volts and supplies power to op-amps 206, 226, 228, and 230; and op-amps 64, 76, 150, 152, 166, and 168 are operated from a 14.1 volt power supply. By way of example, and not as a limitation, the following tables list the highly preferred values and tolerances for the resistors, capacitors, and diodes when PI controller 10 is employed in HVAC control.

| Resistor | Value | Tolerance |
| --- | --- | --- |
| 50 | 4.53 K | 0.1% |
| 52 | 1.24 K | 0.1% |
| 54 | 10 K | 5% |
| 56 | 6.65 K | 1% |
| 58 | 1.47 K | 0.1% |
| 60 | 4.7 K | 5% |
| 66 | 2.32 K | 0.1% |
| 70 | 10 K | 5% |
| 72 | 4.7 K | 5% |
| 78 | 2.67 K | 0.1% |
| 80 | 82.5 K | 0.1% |
| 82 | 2.67 K | 0.1% |
| 84 | 82.5 K | 0.1% |
| 86 | 4.7 K | 5% |
| 88 | 500 Ω | 20% |
| 90 | 4.7 K | 5% |
| 92 | 891 Ω* | 5% |
| 94 | 100 K | 20% |
| 96 | 10 K | 5% |
| 98 | 10 K | 5% |
| 100 | 78.7 K | 1% |
| 102 | 50 K | 20% |
| 124 | 2.74 K | 1% |
| 126 | 6.65 K | 1% |
| 128 | 2.74 K | 1% |
| 130 | 6.65 K | 1% |
| 132 | 150 K | 5% |
| 134 | 390 K | 5% |
| 136 | 910 K | 5% |
| 138 | 100 K | 10% |
| 140 | 10 K | 5% |
| 142 | 330 K | 5% |
| 144 | 30 K | 5% |
| 158 | 5.45 K | 1% |
| 160 | 5.45 K | 1% |
| 162 | 6.65 K | 1% |
| 164 | 6.65 K | 1% |
| 165 | 10 K | 5% |
| 180 | 178 K | 1% |
| 182 | 178 K | 1% |
| 184 | 107 K | 1% |
| 186 | 10 K | 20% |
| 188 | 107 K | 1% |
| 190 | 6.65 K | 1% |
| 192 | 200 K | 1% |
| 194 | 200 K | 1% |
| 196 | 200 K | 1% |
| 198 | 100 K | 1% |
| 200 | 200 K | 1% |
| 208 | 10 K | 5% |
| 210 | 30 K | 5% |
| 212 | 33 Ω | 5% |
| 214 | 10 K | 5% |
| 216 | 7.5 K | 0.1% |
| 218 | 1.5 K | 0.1% |
| 220 | 100 Ω | 0.1% |
| 222 | 10 K | 5% |

| Capacitor | Value | Diode | Part No. |
| --- | --- | --- | --- |
| 62 | 10 µF L.L. | 170 | 1N4004 |
| 74 | 10 µF L.L. | 232 | 1N4004 |
| 104 | .47 µF | 234 | 1N4004 |
| 146 | 47 µF L.L. | | |
| 202 | 220 pF | | |
| 224 | 220 pF | | |

*1.1 K in parallel with a 4.7 K

OPERATION OF THE PI CONTROLLER

The following is a discussion of how PI controller 10 operates to control a system variable such as the temperature of room air 30. Setpoint circuit 12 provides error generator 16 with a setpoint signal representative of the desired value of the temperature of room air 30. Sensor circuit 14 includes a sensing element that is thermally coupled to room air 30 to provide error generator 16 with a sensor signal indicative of actual air temperature. Comparator 32 subtracts the sensor signal from the setpoint signal and adds to the result the value of Vref. Comparator 32 therefore generates a difference signal that is offset by the value of Vref. Error amplifier 34 multiplies this difference signal by a proportionality factor to generate an error signal. The proportionality factor is selected in accordance with the desired sensitivity of PI controller 10 to deviations of sensed air temperature from the setpoint.

Mode selector 18 permits PI controller 10 to be configured to operate in either a heating or cooling mode. When the heating mode is selected, integrator 20 is operable to produce a control signal that drives actuator 28 whenever the sensed value of the temperature of room air 30 is less than the setpoint. When the cooling mode is selected, integrator 20 is operable to control actuator 28 whenever the sensed value of the temperature is greater than the setpoint. As will be described in greater detail below, this is preferably accomplished by selectively routing the error signal and Vref to integrator 20 and integration disable 22 on opposite ones of the two outputs of mode selector 18.

Integrator 20 generates a PI control signal that is proportional to the difference between the signals on the two outputs of mode selector 18 plus a feedback signal from capacitance and multiplier feedback 42 that represents the integral portion of the PI control signal. Control selector 40 configures PI controller 10 to operate in either proportional plus integral or proportional only mode. Preferably, control selector 40 is also employed to permit selection of a range of integrating time constants. Capacitance multiplier and feedback 42 provide the integral term storage element (a capacitor) and the feedback to summing junction 36 which makes integration possible. Integration disable 22 operates to remove the integral portion of the PI control signal term when the error signal deviates from Vref by a predetermined maximum.

Minimum output select 24 allows scaling of the PI control signal to a range of voltages having a minimum voltage that is greater than zero volts. Thus, minimum output select 24 can be used to provide a desired minimum operating level of actuator 28. Output stage 26 converts the scaled PI control signal to industry standard voltages and currents to make PI controller 10 compatible with any of a variety of commercially available actuators 28.

Air temperature is monitored by sensor circuit 14. As shown in FIG. 2A, resistor 68 is a thermistor which has a resistance indicative of its temperature. Thermistor 68 may be suitably be a KTY81 110, manufactured by Amprex Electronic Corp. By thermally coupling thermistor 68 to room air 30, the resistance of thermistor 68 will be representative of the temperature of room air 30. Thermistor 68 has a positive temperature coefficient so that higher resistances are indicative of higher temperatures. The resistance of thermistor 68 is converted to a voltage at the common node of resistors 66 and 68. This voltage is filtered by resistor 70 and capacitor 74 and then supplied to op-amp 76 via resistor 72. Op-amp 76 is a unity gain amplifier and acts simply as a buffer of the filtered signal appearing across capacitor 74. Op-amp 76 provides error generator 16 with the sensor signal.

It will of course be understood by those skilled in the art that any of a variety of temperature sensing devices may be used in place of thermistor 68 and sensing circuit 14. Moreover, where the system variable sought to be controlled is something other than temperature, any device (including any necessary additional circuitry) that can sense or measure the value of the system variable and provide error generator 16 with a signal representative of that value can be employed without departing from the present invention.

The setpoint signal provided to error generator 16 from setpoint circuit 12 is derived in much the same way as the sensor signal in sensor circuit 14. Thermistor 68 is replaced by resistors 52, 54, and 58. Resistor 54 is a variable resistor that can be set to provide a signal indicative of the desired temperature of room air 30 This signal is filter by resistor 56 and capacitor 62, buffered by op-amp 64, and provided to error generator 16.

The voltage of the sensor and setpoint signals will fluctuate with variations of Vref. However, the difference signal generated by comparator 32 is equal to the difference between the setpoint and sensor signals. Therefore, because fluctuations in Vref are reflected in both the sensor and setpoint signals, their difference is substantially independent of those fluctuations. It will therefore be appreciated that deriving both the sensor and setpoint signals from a common reference voltage permits the generation of an error signal that is substantially independent of fluctuations of that reference voltage.

Vref is also provided to error generator 16 and integrator 20 where it is summed into comparator 32, error amplifier 34, and integrating amplifier 148. As a result, the difference signal and error signal generated by comparator 32 and error amplifier 34, respectively, are offset by an amount equal to Vref. Adding Vref to the difference and error signals has the effect of shifting the reference point of these signals by the value of Vref. By choosing a suitably large value of Vref, the range of possible voltages of the difference and error signals can be confined to either the positive or negative voltage domain only. Thus, both positive and negative deviations of the setpoint signal from the sensor signal can be integrated by integrator 20 without having to provide PI controller 10 with both positive and negative voltages. As will be explained in greater detail, Vref is eventually subtracted by integrating amplifier 148 so that the accuracy of PI controller 10 is substantially independent of variations of Vref.

Vref is summed into comparator 32 through resistors 84 and 88. The output of comparator 32 is calibrated using resistors 86, 88, and 90 as follows. Variable resistor 88 is set to zero ohms, such that Vref is connected directly across resistor 90. Voltage V1 thereby has no effect in the voltage across resistor 90. The non-inverting inputs of op-amps 64 and 76 are tied together and set to a voltage within their input common mode range. The output of comparator 32 is then measured. If its output is greater than Vref then resistor 86 is removed from PI controller 10 and VI is not summed into comparator 32. Resistor 88 is then varied until the output of comparator 32 equals Vref. On the other hand, if the output of comparator 32 was less than Vref when measured, then resistor 90 is removed and resistor 88 is varied until the output of comparator 32 equals Vref. This calibration eliminates the effect of the input offset voltage of op-amps 32, 64, and 76.

Preferably, the ratio of the value of resistor 80 to that of resistor 78 is the same as the ratio of resistor 84 to resistor 82. As a result, the sensor and setpoint signals will be amplified by the same gain so that the difference signal generated by comparator 32 is simply [(setpoint signal—sensor signal) * (resistor 80÷resistor 78)]+Vref. By way of example, if the setpoint signal exceeds the sensor signal by 32.4 mV and Vref is equal to 5 volts, then the difference signal generated by comparator 32, which preferably has a gain of 30.9 (resistor 80÷resistor 78), will be 6 volts [(0.0324 volts * 30.9)+5 volts].

Error amplifier 34 is used to invert the difference signal about Vref and to multiply it by a proportionality factor ratio of the sum of resistors 100 and 102 to sum of resistors 92 and 94. This proportionality factor is simply the gain of the amplifier stage containing error amplifier 34 and is used to define the proportional band of PI controller 10. Preferably, resistor 94 is sufficiently larger than resistor 92 such that resistor 94 can be set to define any of a variety of proportionality bands from as small as a 1° F. band to as large as a 30° F. band. As will be understood by those skilled in the art, a higher proportionality factor (gain) results in a smaller proportional range.

Resistor 102 permits calibration of the proportional band. This is accomplished by setting the proportionality factor to its smallest value (i.e., utilizing the full resistance value of variable resistor 94), setting the setpoint and sensor at the opposite limits of the corresponding proportional band, and varying resistor 102 until integrating amplifier 148 is at the edge of saturation.

Preferably, the voltage of Vref is near the middle of the input common mode voltage range of comparator 32, error amplifier 34, and integrating amplifier 148. This permits PI controller 10 to accommodate a large proportional band. Smaller proportional bands can then be provided simply by altering the value of resistor 94.

Mode selector 18 permits PI controller 10 to be configured into either a heating or cooling mode. Since thermistor 68 has a positive temperature coefficient, if the setpoint is above the temperature of room air 30, thermistor 68 will generate a sensor signal having a voltage lower than the setpoint signal. The difference between the setpoint and sensor signals will be a positive value and the difference signal generated by comparator 32 will therefore be greater than Vref. When the difference signal is multiplied by the proportionality factor and inverted by error amplifier 34, the resultant error signal will be a voltage that is somewhat less than Vref. With switch 110 in the first position, as shown in FIG. 2B, the error signal is coupled to the inverting input of integrating amplifier 148 and Vref is coupled to the non-inverting input of integrating amplifier 148 Since Vref is greater than the error signal, integrating amplifier 20 will produce a non-zero output which will operate actuator 28. If actuator 28 provides heat to room air 30, then it will be appreciated that, with switch 110 in this first position, actuator 28 is operable to increase the temperature of room air 30 toward the setpoint and PI controller 10 therefore is operating in a heating mode.

If switch 110 were to be moved to its second position such that Vref was coupled to the inverting input and the error signal to the non-inverting input, integrating amplifier 148 would produce a zero voltage output because the error signal is less than Vref. However, if the temperature of room air 30 is greater than the setpoint, the setpoint signal would then be less than the sensor signal and the resulting error signal would be greater than Vref. With switch 110 in its second position, integrating amplifier 148 would then produce a non-zero output. If actuator 28 removes heat from room air 30, then PI controller 10 would be operable to cool room air 30 toward the setpoint. Thus, the second position of switch 110 corresponds to a cooling mode.

In its first position (heating mode), switch 110 connects the error signal to resistors 124 and 158 and Vref to resistors 128 and 160. The error signal is therefore provided to the inverting input of integrating amplifier 148 which, in this mode, generates the inverted or negative time integral of the error signal. That is, integrating amplifier 148 integrates the error signal and multiplies the result by negative one ($-1$).

In its second position (cooling mode), switch 110 connects Vref to resistors 124 and 158 and the error signal to resistors 128 and 160. In this mode, the error signal is provided to the non-inverting input of integrating amplifier 148 which therefore generates the non-inverted or positive time integral of the error signal, or simply, the time integral of the error signal.

Other means of operating integrator 20 to generate inverted and non-inverted time integrals may be employed without departing from the present invention. For instance, rather than switching the connections of Vref and the error signal to the inputs to integrator 20, Vref could be connected to resistor 128 and mode selector 18 could include means for generating an inverted error signal and means for selectively applying the error signal or inverted error signal to the inverting input of integrating amplifier 148. The means for generating an inverted error signal may be an op-amp inverter having a gain of one with Vref coupled to the non-inverting input of the op-amp inverter. This would generate an inverted error signal offset by Vref having negative deviations from Vref where the error signal has positive deviations and vice-a-versa. A simple switch may then be used to apply either the error signal to integrator 20 for the inverting (heating) mode or the inverted error signal for the non-inverting mode (cooling). Alternatively, Vref may be coupled to the inverting input of integrating amplifier 148 with the error signal or inverted error signal coupled to the non-inverting input so that the error signal corresponds to the non-inverted (cooling) mode and the inverted error signal would correspond to the inverted (heating) mode.

Integrating amplifier 148 serves as both summing junction 36 and amplifier 38. Regardless of the mode chosen by mode selector 18, integrating amplifier 148 removes the Vref component of the error signal, which had been added by error generator 16. This is accomplished by maintaining the ratio of the value of resistor 126 to resistor 124 equal to the ratio of resistor 130 to resistor 128. The error signal and Vref are therefore combined in a 1:1 ratio, each at a gain determined by the ratio of resistor 126 to resistor 124. Additionally, this permits unity feedback of the PI control signal generated by integrating amplifier 148 The net effect of providing Vref and the error signal to opposite ones of the inputs of integrating amplifier 148 is subtraction of Vref from the error signal so that fluctuations in Vref added to the error signal by error generator 16 are removed when Vref is subtracted by integrating amplifier 148.

Since the connections of Vref and the error signal to integrator 20 depend upon mode selector 18, the PI control signal is defined by two equations, one corresponding to the heating mode and the other to the cooling mode. In the heating mode, the PI control signal=[(resistor 126÷resistor 124) * (Vref−error signal)]+feedback, where the feedback signal is generated by op-amp 150. In the cooling mode, the PI control signal=[(resistor 126+resistor 124) * (error signal—Vref)]+feedback. The feedback portion of this equation represents the integral term of the PI control signal with the remainder of this equation comprising the proportional term of the PI control signal. Thus, it will be appreciated that integrating amplifier 148 provides both proportional and integral control of room air 30.

Integrating amplifier 148 is operable as an integrator by the provision of feedback to its non-inverting input via resistor 132 (or resistor 134 or resistor 136 as might be chosen by control selector 40), resistor 138, op-amp 150, and resistor 130. Capacitor 146 is charged and discharged through resistor 138 in accordance with the output of integrating amplifier 148. Preferably, the rate at which capacitor 146 is charged is selectable via control select 40. This stored value of the output of integrating amplifier 148 is fed back to the non-inverting input which, as will be understood by those skilled in the art, results in integration of the error signal.

More particularly, capacitance multiplier 156 can be viewed as a single capacitance connected between the second end of resistor 138 and ground. This capacitance is charged by integrating amplifier 148 through the series combination of resistors 132 and 138. The voltage across this capacitor is buffered by unity gain op-amp 150 and summed into the non-inverting input of integrating amplifier 148 via resistor 130. Resistors 132 and 138 provide the resistance value and capacitance multiplier 156 provides the capacitance value of the integration time constant, so that τ=(resistor 132+resistor 138) * capacitance multiplier 156.

Capacitance multiplier 156 serves to multiply the capacitance value of capacitor 146 while maintaining the leakage current characteristic of capacitor 146. That is, the capacitance value of capacitor 146 is multiplied, but the leakage current is not. Thus, capacitance multiplier 156 permits PI controller 10 to achieve long integration time constants without the use of very large resistor values that approach parasitic circuit impedances or large capacitor values that are accompanied by large leakage currents.

With continued reference to FIG. 2B, capacitance multiplier 156 serves to increase the effective capacitance of capacitor 146 by utilizing unity gain op-amp 152 which operates to slow the charging and discharging of capacitor 146 It will be appreciated that at all times the output of op-amp 152 is equal to the voltage across capacitor 146. Upon a change in the output of integrating amplifier 148, a portion of the charging current provided to capacitance multiplier 156 is diverted from capacitor 146 by op-amp 152 via resistor 140. Since the voltage across capacitor 146 and the output of op-amp 152 are always the same, the amount of current diverted by op-amp 152 depends simply upon the relative values of resistors 140 and 142. In a highly preferred embodiment, resistor 140 is equal to 10 K and resistor 142 is equal to 330 K. Thus, 330 K+(10 K+330 K) or 97.06% of the charging current is diverted by op-amp 152 and capacitor 146 receives only 10 K+(10 K+330 K) or 2.94% of the charging current. Therefore, capacitor 146 receives 100%+2.94% or 34 times less charging current than it otherwise would, which to the rest of the circuit makes capacitance multiplier 156 appear as a capacitor having a capacitance equal to 34 times the value of capacitor 146. Thus, it will be appreciated that the multiplication factor provided by capacitance multiplier 156 depends simply upon the relative values of resistors 140 and 142 and, where their difference is at least an order of magnitude, the multiplication factor can be approximated simply by the ratio of resistor 142 to resistor 140.

It will of course be understood that capacitance multiplier 156 could be employed in any type of integrator to increase the effective capacitance of the capacitor used to store the integral term. For example, capacitance multiplier 156 could be used in an inverting (Miller) integrator in which the capacitor is connected between the output and inverting input of the integrating amplifier. All such variations are contemplated by the present invention.

Control selector 40 permits configuring of PI controller 10 into either a proportional plus integral or a proportional only mode. PI control can be selected by connecting any one of resistors 132, 134, and 136 to resistor 138 via switch 154. Proportional only control is selected by connecting the first end of resistor 138 to ground via switch 154. Connecting resistor 138 to ground acts to remove the feedback summed into the non-inverting input of integrating amplifier 148. This occurs because capacitor 146 discharges completely through resistors 138 and 142 and the feedback signal generated by op-amp 150 is therefore zero volts. The selection between resistors 132, 134, and 136 permits different integration time constants, but does not affect the mode of control. Thus, control selector 40 need only switch the first end of resistor 138 between a resistor connected to the output of integrating amplifier 148 and a ground connection to permit switching between proportional plus integral and proportional only control.

When operating in the proportional plus integral control mode, it is desirable to remove the integral component of the PI control signal when the difference between the sensor and setpoint signals, as amplified by error generator 16, exceed a predetermined maximum. In a preferred embodiment, this is accomplished by integration disable 22 which operates to connect the first end of resistor 138 to ground when the error signal deviates from Vref by an amount determined by resistors 158, 160, 162, and 164. An output greater than Vref from op-amp 166 will cause the output of op-amp 168 to go to zero volts, discharging capacitor 146 via resistor 142, resistor 138, and diode 170. This has the same effect on integrator 20 as connecting the first end of resistor 138 to ground via control selector 40.

In the heating mode, Vref is coupled to the non-inverting input of op-amp 166 and the error signal is coupled into the inverting input. The voltage at the non-inverting input of op-amp 166 will depend on the values of resistors 160 and 164. Op-amp 166 will drive its output to the voltage necessary to equalize its inputs. Therefore, the output voltage of op-amp 166 will depend upon the error signal applied to resistor 158. When the setpoint signal exceeds the sensor signal by a large amount, the error signal approaches zero volts and the output of op-amp 166 increases to maintain the voltage at its inverting input equal to that at its non-inverting input. The amount of error needed to make the output of op-amp 166 greater than Vref to thereby toggle op-amp 168 and disable integration can be fixed by the values of resistors 158 and 162.

Operation of integration disable 22 is similar when PI controller 10 is configured into a cooling mode. In this mode, Vref is coupled to the inverting input of op-amp 166 and the error signal is coupled to the non-inverting input. If the sensed temperature exceeds the setpoint by a large value, the error signal will greatly exceed Vref and the output of op-amp 166 will increase above Vref to equalize its inputs. It will therefore be appreciated that resistors 158, 160, 162, and 164 can be selected to cause integration disable 22 to remove the integral term of the PI control signal when the proportional component alone becomes large enough to drive actuator 28 at its maximum. This allows actuator 28 to be run at its maximum while the error is great, but precludes the problem of windup typically associated with integral control.

Referring now to FIG. 2C, the PI control signal is provided to minimum output select 24. The range of potential voltages produced by integrating amplifier 148 are scaled by minimum output select 24 to a new range of voltages. The new range has the same maximum voltage as that provided by integrating amplifier 148, but has a minimum voltage selectable by variable resistor 186. The gain of the amplifier stage incorporating op-amp 204 is equal to resistor 184÷resistor 180. Preferably, the ratio of resistor 184 to resistor 180 is equal to the ratio of resistor 188 to resistor 182 so that the output of op-amp 204 is equal to the voltage tapped by the wiper arm of resistor 186—(PI control signal * gain). Op-amp 206 preferably sums PI control signal via resistor 194 with the output of op-amp 204 via resistor 192 at a 1:1 ratio. The values of resistors 192, 194, 196, 198, and 200 are selected such that the output of op-amp 206 is equal to the sum of the PI control signal and the output of op-amp 204.

Minimum output select 24 allows PI controller 10 to be configured to provide a minimum output even when the sensor and setpoint signals are equal. This is advantageous where it is desirable to set a minimum position for actuator 28. Additionally, many commercially available HVAC actuators operate from an industry standard 4 to 20 milliamps of current. Thus, it is desirable to provide 4 milliamps of current to such an actuator even when the error signal is equal to zero.

Preferably, output stage 26 is included to provide the low impedance power needed to drive actuator 28. Output stage 26 provides industry standard voltages and currents that are used to drive many commercially available actuators. In accordance with the broader aspects of the invention, output stage 26 is not required and actuator 28 may be driven directly from the PI control signal generated by integrator 20 or from the scaled PI control signal generated by minimum output select 24.

Thus, it should be apparent that there has been provided in accordance with the present invention an antiwindup proportional plus integral controller that fully satisfies the aims and advantages described herein. Although the invention has been described in conjunction with specific embodiments thereof, it is evident that many alternatives, modifications, and variations will be apparent to those skilled in the art. For instance, the functions described and claimed could be carried out by software in a general purpose computer. Accordingly, it is intended to embrace all such alternatives, modifications, and variations that fall within the spirit and scope of the appended claims.

We claim:

1. A closed loop control system for adjusting the value of a system variable, comprising:

setpoint means for providing a setpoint signal representative of a desired value of the system variable;

sensor means for providing a sensor signal representative of a measured value of the system variable;

error generating means for generating an error signal relating to the difference between said setpoint signal and said sensor signal by a proportionality factor, wherein said error generating means includes proportional control means for varying said proportionality factor;

integrator means for generating a control signal related to the time integral of said error signal;

integration disabling means for causing said integrator means to generate said control signal so that said control signal is proportionally related to said error signal when said error signal exceeds a fixed predetermined level; and control means responsive to said control signal for adjusting the value of the system variable.

2. A system as defined in claim 1 further including means for providing a first reference voltage, wherein said system is a circuit arrangement and said setpoint signal and said sensor signal depend from said first reference voltage to cause said error signal to be substantially independent of variations of said first reference voltage.

3. A system as defined in claim 2 further including means for providing a second reference voltage, wherein said error signal is confined to a predetermined range of voltages and wherein said error signal is offset by said second reference voltage and has a magnitude such that the summation of said second reference voltage with said predetermined range provides a shifted range of voltages that are of only one polarity, whereby said circuit is operable from a single polarity of voltage.

4. A system as defined in claim 3 wherein said first reference voltage and said second reference voltage are equal.

5. A system as defined in claim 1, wherein said error generating means includes:

comparator means for comparing said sensor signal with said setpoint signal to generate a difference signal, and amplifier means for multiplying said difference signal by said proportionality factor to generate said error signal.

6. A system s defined in claim 5, wherein said comparator means includes an operational amplifier having an inverting input, a non-inverting input, and an output, wherein said amplifier means includes a first resistive element and a second resistive element, wherein said second resistive element is connected between said output and said inverting input, wherein one of said sensor and setpoint signals is provided to said non-inverting input, wherein the other of said sensor and setpoint signals is provided through said first resistive element to said inverting input, and wherein said proportional control means includes means for varying the resistance value of one of said first or second resistive elements.

7. A system as defined in claim 5, wherein said comparator means includes a first input, a second input, and a first output, wherein said sensor signal is provided to said first input and said setpoint signal is provided to said second input, wherein said amplifier means includes a third input, a fourth input, a second output, a first resistive element connected between said first output and said third input, and a second resistive element connected between said second output and said third input, and wherein said proportional control means includes means for varying the resistance value of one of said first or second resistive elements 8. A system as defined in claim 1 wherein said integrator means includes a first input and a second input, wherein said system further comprises mode switching means for selecting either a first operational mode or a second operational mode, wherein when said first operational mode is selected, said control signal is proportional to the time integral of said error signal and when said second operational mode is selected, said control signal is proportional to the inverted time integral of said error signal.

9. A system as defined in claim 8 wherein the system variable is temperature and said first and second operational modes correspond to cooling and heating modes respectively, wherein when said measured value is greater than said desired value and said cooling mode is selected, said control means causes said temperature to be reduced and when said measured value is less than said desired value and said heating mode is selected, said control means causes said temperature to be increased.

10. A system as defined in claim 1 wherein said integrator means comprises an integrating amplifier, including an inverting input, a non-inverting input, and an output, capacitance means operatively connected to said output for storing an integration value related to the time integral of said error signal, and feedback means connected to said capacitance means for providing one of said inputs with a feedback signal proportional to said integration value, wherein said integrating amplifier is arranged to charge and discharge said capacitance means in accordance with the time integral of the difference between said non-inverting input and said inverting input.

11. A system as defined in claim 10 wherein said capacitance means includes a capacitive element and means for multiplying the capacitance value of said capacitive element while maintaining the leakage current of said capacitance means substantially equal to the leakage current of said capacitive element.

12. A system as defined in claim 11 further including control selecting means for selecting either a proportional mode or a proportional plus integral mode, wherein, when said proportional mode is selected, said control signal is proportional to said error signal and, when said proportional plus integral mode is selected, said control signal is proportional to the time integral of said error signal.

13. A system as defined in claim 10, wherein said integration disabling means is coupled to said capacitance means and responsive to said error signal for selectively discharging said capacitance means such that said control signal is proportional to said error signal.

14. A closed loop control system for adjusting the value of a system variable, comprising:
setpoint means for providing a setpoint signal representative of a desired value of the system variable;
sensor means for providing a sensor signal representative of a measured value of the system variable;
error generating means for generating an error signal relating to the difference between said setpoint signal and said sensor signal by a proportionality factor, wherein said error generating means includes proportional control means for varying said proportionality factor;
integrator means including a first input and a second input for generating a control signal related to the time integral of said error signal;
control means responsive to said control signal for adjusting the value of the system variable; and
mode switching means for selecting either a first operational mode or a second operational mode,
wherein when said first operational mode is selected, said error signal is provided to said first input and said control signal is proportional to the time integral of said error signal and when said second operational mode is selected, said error signal is provided to said second input and said control signal is proportional to the inverted time integral of said error signal.

15. A closed loop control system for adjusting the value of a system variable, comprising:
setpoint means for providing a setpoint signal representative of a desired value of the system variable;
sensor means for providing a sensor signal representative of a measured value of the system variable;
error generating means for generating an error signal relating to the difference between said setpoint signal and said sensor signal by a proportionality factor, wherein said error generating means includes proportional control means for varying said proportionality factor;
integrator means including a first input and a second input for generating a control signal related to the time integral of said error signal;
control means responsive to said control signal for adjusting the value of the system variable and
mode switching means for selecting either a first operational mode or a second operational mode ad including means for inverting said error signal to generate an inverted error signal, wherein when said first operational mode is selected, said error signal is provided to one of said inputs and said control signal is proportional to the time integral of said error signal and, when said second operational mode is selected, said inverted error signal is provided to said one of said inputs and said control signal is proportional to the inverted time integral of said error signal.

16. A closed loop control system for adjusting the value of a system variable, comprising:
setpoint means for providing a setpoint signal representative of a desired value of the system variable;
sensor means for providing a sensor signal representative of a measured value of the system variable;
error generating means for generating an error signal relating to the difference between said setpoint signal and said sensor signal by a proportionality factor, wherein said error generating means includes proportional control means for varying said proportionality factor;
integrator means for generating a control signal related to the time integral of said error signal, said integrator means including an integrating amplifier including an inverting input, a non-inverting input, and an output capacitance means operatively connected to said output for storing an integration value related to the time integral of said error signal, and feedback means connected to said capacitance means for providing one of said inputs with a feedback signal proportional to said integration value, wherein said integrating amplifier is arranged to charge and discharge said capacitance means in accordance with the time integral of the difference between said non-inverting input and said inverting input;

integration disabling means coupled to said capacitance means and responsive to said error signal for selectively discharging said capacitance means such that said control signal is proportional to said error signal;

control means responsive to said control signal for adjusting the value of the system variable, said integration disabling means including first operational amplifier means coupled to said error generating means for generating an error magnitude signal proportional to said error signal, and second operational amplifier means for discharging said capacitance means when said error magnitude signal exceeds a predetermined threshold voltage.

17. A system as defined in claim 16 wherein said second operational amplifier means comprises:

an operational amplifier having a first input, a second input and a disable output, wherein said first input is connected to said first operational amplifier means to receive said error magnitude signal;

voltage reference means connected to said second input for providing said threshold voltage to said second input; and a diode having an anode and a cathode, wherein said cathode is connected to said disable output of said operational amplifier and said anode is coupled to said capacitance means.

18. An anti-windup proportional plus integral controller for adjusting the value of a system variable, comprising:

setpoint means for providing a setpoint signal representative of a desired value of the system variable;

sensor means for providing a sensor signal representative of a measured value of the system variable;

error generating means for generating an error signal relating to the difference between said setpoint signal and said sensor signal by a proportionality factor, wherein said error generating means includes proportional control means for varying said proportionality factor;

integrator means for generating a control signal related to the time integral of said error signal;

integration disabling means responsive to said error signal for selectively disabling the integration of said error signal by said integrating means such that said control signal is proportional to said error signal when said error signal exceeds a fixed predetermined level; and control means responsive to said control signal for adjusting the value of the system variable.

19. A proportional plus integral controller for providing temperature control, comprising:

setpoint means for providing a setpoint signal representative of a desired value of a temperature to be controlled;

sensor means for generating a sensor signal representative of a desired value of a temperature to be controlled;

sensor means for generating a sensor signal representative of a measured value of said temperature;

error generating means for generating an error signal proportional to the difference between said setpoint signal and said sensor signal;

integrating means for generating a control signal relating to the time integral of said error signal;

integration disable means for causing said integrating means to generate said control signal so that said control signal is proportionally related to said error signal when said error signal exceeds a fixed predetermined level;

control means responsive to said control signal for adjusting said temperature; and mode switching means for selecting either a cooling mode or a heating mode, wherein when said cooling mode is selected and said measured value is above said desired value, said control means causes said temperature to be lowered to approximately said desired value and when said heating mode is selected and said measured value is below said desired value, said control means causes said temperature to be increased to approximately said desired value.

20. A controller as defined in claim 19 further including control selecting means for selecting either a proportional mode or a proportional plus integral mode, wherein when said proportional mode is selected, said control signal is proportional to said error signal and when said proportional plus integral mode is selected, said control signal is proportional to the time integral of said error signal.

* * * * *